United States Patent
Lal et al.

(10) Patent No.: US 12,279,000 B2
(45) Date of Patent: Apr. 15, 2025

(54) SYSTEMS AND METHODS FOR PERSONALIZED SPATIAL VIDEO/LIGHT FIELD CONTENT DELIVERY

(71) Applicant: Adeia Guides Inc., San Jose, CA (US)

(72) Inventors: Dhananjay Lal, Englewood, CO (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 85 days.

(21) Appl. No.: 17/966,471

(22) Filed: Oct. 14, 2022

(65) Prior Publication Data

US 2024/0129562 A1     Apr. 18, 2024

(51) Int. Cl.
| | | |
|---|---|---|
| G06F 15/16 | (2006.01) |
| H04L 65/65 | (2022.01) |
| H04N 21/218 | (2011.01) |
| H04N 21/2343 | (2011.01) |
| H04N 21/258 | (2011.01) |

(52) U.S. Cl.
CPC ....... H04N 21/23439 (2013.01); H04L 65/65 (2022.05); H04N 21/21805 (2013.01); H04N 21/25891 (2013.01)

(58) Field of Classification Search
CPC .............. H04L 65/65; H04N 21/23439; H04N 21/21805; H04N 21/25891
See application file for complete search history.

(56) References Cited

U.S. PATENT DOCUMENTS

| 11,632,531 | B1* | 4/2023 | Bryan | ................ | H04N 21/4307 |
| | | | | | 348/43 |
| 2011/0221745 | A1* | 9/2011 | Goldman | ................ | G06F 3/167 |
| | | | | | 345/419 |
| 2013/0016094 | A1* | 1/2013 | Cho | ..................... | H04N 13/117 |
| | | | | | 345/173 |
| 2013/0128013 | A1* | 5/2013 | Trinh | ................... | H04N 13/359 |
| | | | | | 348/54 |
| 2017/0118540 | A1 | 4/2017 | Thomas et al. | | |
| 2018/0217804 | A1* | 8/2018 | Manohar | ................ | G06V 20/20 |
| 2019/0102944 | A1* | 4/2019 | Han | ........................ | G06F 3/012 |
| 2020/0045285 | A1 | 2/2020 | Varerkar et al. | | |

(Continued)

OTHER PUBLICATIONS

"Light Field Imaging Technology", "Light Field Imaging Technology," Tech Briefs, Mar. 11, 2021. https://www.techbriefs.com/component/content/article/tb/supplements/pit/features/technology-leaders/38622.

(Continued)

*Primary Examiner* — Oleg Survillo
(74) *Attorney, Agent, or Firm* — Haley Guiliano LLP

(57) ABSTRACT

Systems and methods are provided herein for streaming immersive content to a device. This may be accomplished by a system displaying a piece of media on a display in a first format and determining that the piece of media is approaching a segment of the piece of media that is available in a second format (e.g., light field content). In response to determining that the upcoming segment is available in the second format, the system can use one or more sensors to determine a position of a user in relation to the display. The system can then send a request for the piece of media in the second format, wherein the request comprises the position of the user. The system can then receive and display the segment of the piece of media in the second format, wherein the segment is customized according to the position of the user.

19 Claims, 9 Drawing Sheets

(56) References Cited

U.S. PATENT DOCUMENTS

| | | | |
|---|---|---|---|
| 2020/0193671 A1* | 6/2020 | Tamir | G06T 7/251 |
| 2021/0248789 A1* | 8/2021 | Du | G06F 16/9538 |
| 2021/0281810 A1* | 9/2021 | Li | H04N 13/111 |
| 2021/0383604 A1* | 12/2021 | Hobin | G06T 17/00 |
| 2022/0078396 A1* | 3/2022 | Gul et al. | H04L 65/613 |
| 2022/0239719 A1* | 7/2022 | Gül | H04N 21/6587 |
| 2022/0256132 A1* | 8/2022 | Legallais | H04N 21/218 |
| 2022/0264080 A1 | 8/2022 | Harviainen et al. | |
| 2022/0335476 A1* | 10/2022 | Abdel-Wahab | G06Q 30/0255 |
| 2023/0083884 A1* | 3/2023 | Molitor | G06V 20/42 |
| | | | 345/633 |
| 2023/0094522 A1* | 3/2023 | Stauber | G06F 3/165 |
| | | | 715/719 |
| 2023/0096417 A1* | 3/2023 | Mullican | G06T 7/70 |
| | | | 382/103 |
| 2023/0281933 A1* | 9/2023 | Pease | H04N 23/6811 |
| | | | 345/419 |
| 2023/0421810 A1* | 12/2023 | Hu | H04N 19/597 |
| 2024/0040099 A1* | 2/2024 | Da Veiga | G06F 3/013 |

OTHER PUBLICATIONS

"Lytro Lightfield Camera—General Info", "Lytro Lightfield Camera—General Info," LightField Forum. http://lightfield-forum.com/lytro/lytro-lightfield-camera/.

"Real-time Transport Protocol", "Real-time Transport Protocol," Wikipedia. https://en.wikipedia.org/wiki/Real-time_Transport_Protocol.

"What is Motion-To-Photon Latency?", "What is Motion-To-Photon Latency?," Chioka.In, http://www.chioka.in/what-is-motion-to-photon-latency/.

Hollister, Sean , "Looking Glass might have just invented the GIF's 3D successor", Hollister, Sean, "Looking Glass might have just invented the GIF's 3D successor," The Verge, Jun. 1, 2022. https://www.theverge.com/23132875/looking-glass-blocks-3d-vr-sharable-image.

Ip, Andrew , et al., "The Cable Network, Immersive Experiences and Lightfields", Ip, Andrew et al., "The Cable Network, Immersive Experiences and Lightfields," Broadband Library. https://broadbandlibrary.com/the-cable-network-immersive-experiences-and-lightfields/.

Kim, Meejin , et al., "Fusion Poser: 3D Human Pose Estimation Using Sparse IMUs and Head Trackers in Real Time", Kim, Meejin, et al., "Fusion Poser: 3D Human Pose Estimation Using Sparse IMUs and Head Trackers in Real Time," Sensors 2022, 22, 4846. Https://doi.org/10.3390/s22134846.

Koniaris, Babis , et al., "Real-time Rendering with Compressed Animated Light Fields", Koniaris, Babis, et al., "Real-time Rendering with Compressed Animated Light Fields," Graphics Interface 2017, May 16, 2017.

Levoy, Marc , et al., "Light Field Rendering", Levoy, Marc, et al., "Light Field Rendering," Computer Science Department, Stanford University, Jul. 1996.

Marin-Jimenez, Manuel J., et al., "3D human pose estimation from depth maps using a deep combination of poses", Marin-Jimenez, Manuel J. et al., "3D human pose estimation from depth maps using a deep combination of poses," arXiv:1807.05389v1, Jul. 17, 2018.

Pichler, Benjamin , "HDR Light Field", Pichler, Benjamin, "HDR Light Field," Department of Computer Science (Institute of Computer Graphics), Johannes Kepler University Linz, Oct. 9, 2012.

Rayburn, Dan , "The Advantages of Handling Manifest Manipulation at the Network Edge to Personalize Video Experiences", Rayburn, Dan, "The Advantages of Handling Manifest Manipulation at the Network Edge to Personalize Video Experiences," Streaming Media Blog, Dec. 17, 2018. https://www.streamingmediablog.com/2018/12/manifest-manipulation-at-edge.html.

Sperling, Nicole , "How Atomic Blonde Got Its Most Insane Action Sequence", Sperling, Nicole, "How Atomic Blonde Got Its Most Insane Action Sequence," GQ, Aug. 1, 2017. https://www.gq.com/story/atomic-blonde-david-leitch.

Wu, Gaochang , et al., "Light Field Image Processing: An Overview", Wu, Gaochang, et al., "Light Field Image Processing: An Overview," Journal of Latex Class Files, vol. XX, No. X, Oct. 2017.

3GPP TR 26.998 V1.0.3 (Oct. 2021) Technical Report "3rd Generation Partnership Project; Technical Specification Group SA; Support of 5G Glass-type Augmented Reality/Mixed Reality (AR/MR) Devices; (Release 17)" http://www.3gpp.org, 3GPP France, Oct. 2021.

PCT International Search Report and Written Opinion of the International Searching Authority, International Application No. PCT/US2023/035005, Jan. 26, 2024.

Boronat, Fernando , et al., "HbbTV-Compliant Platform for Hybrid Media Delivery and Synchronization on Single- and Multi-Device Scenarios," IEEE Transactions on Broadcasting, vol. 64, No. 3, Sep. 2018.

* cited by examiner

SYSTEMS AND METHODS FOR PERSONALIZED SPATIAL VIDEO/LIGHT FIELD CONTENT DELIVERY

BACKGROUND

The present disclosure relates to immersive content, and in particular to techniques for delivering immersive content to a user device.

SUMMARY

Light field cameras can capture information about a light field emanating from a scene. The information captured using a light field camera can be used to generate a light field image. Light field images are one way to create more immersive content for a user. For example, light field images can be used to create spatial videos, which make the user feel like they are interacting with a three-dimensional (3D) environment despite the spatial video being displayed on a two-dimensional (2D) display. Immersive content is desirable to many users, but streaming the immersive content includes a number of challenges. Immersive content is often personalized to the user because the position of the user in relation to the display influences what is displayed to create the 3D effect. Traditional methodologies of streaming immersive content require significant computational resources. Accordingly, the quality of the immersive content experience can degrade in situations with limited bandwidth or limited computing power. In view of these deficiencies there exists a need for improved methodologies of streaming immersive content.

Accordingly, improved techniques are disclosed herein for streaming immersive content to a device. A device may be displaying a piece of media in a first format (e.g., 2D) on a display using traditional streaming methodologies. For example, the device may be streaming the piece of media using hypertext transfer protocol (HTTP) adaptive streaming protocols (e.g., dynamic adaptive streaming over HTTP (MPEG-DASH), HTTP live streaming (HLS), common media application format (CMAF), Microsoft Smooth Streaming, etc.). The device may use metadata associated with the piece of media to determine that an upcoming segment of the piece of media is available in a second format (e.g., light field content). As the upcoming segment approaches, the device may display a graphic. The graphic can indicate to the user that the upcoming segment of the piece of media is available in the second format. If the user selects the graphic, the device may switch from displaying the piece of media in the first format to displaying the piece of media in the second format. For example, the device may send a request to a server for a real-time transport protocol (RTP) stream comprising the upcoming segment in the second format. The request can include the position of the users so that the segment in the second format can be tailored to the user. The device may use one or more sensors to determine the position of the user in relation to the device. If the user moves, the one or more sensors can determine an updated position of the user. The updated position can be used to update the immersive content to create the 3D "look around" effect. After completion of the segment in the second format, the device may revert to streaming the piece of media in the first format.

The device may use varying methods to alert the user of immersive content. For example, the device may provide a "View Immersive Content" option in an interactive menu (e.g., such option can be displayed on the movie page and before the movie starts playing). The device may also have access to preferences associated with the user. For example, a first user may have preferences indicating that the device automatically plays immersive content when available. A second user may have preferences indicating that the user prefers the option to view immersive content replays. For example, the device may display an "Immersive Content" replay option as the device displays a segment in a first format and immersive content is available for the displayed segment or a later segment(s). In some embodiments, the option can be displayed before a segment(s) is played if light field content is available for such upcoming segment(s). If the user selects the "Immersive Content" replay option, the device can replay the segment in a second format associated with the immersive content after the segment is done playing in the first format.

BRIEF DESCRIPTION OF THE DRAWINGS

The above and other objects and advantages of the disclosure will be apparent upon consideration of the following detailed description, taken in conjunction with the accompanying drawings.

DETAILED DESCRIPTION

Figure 1:
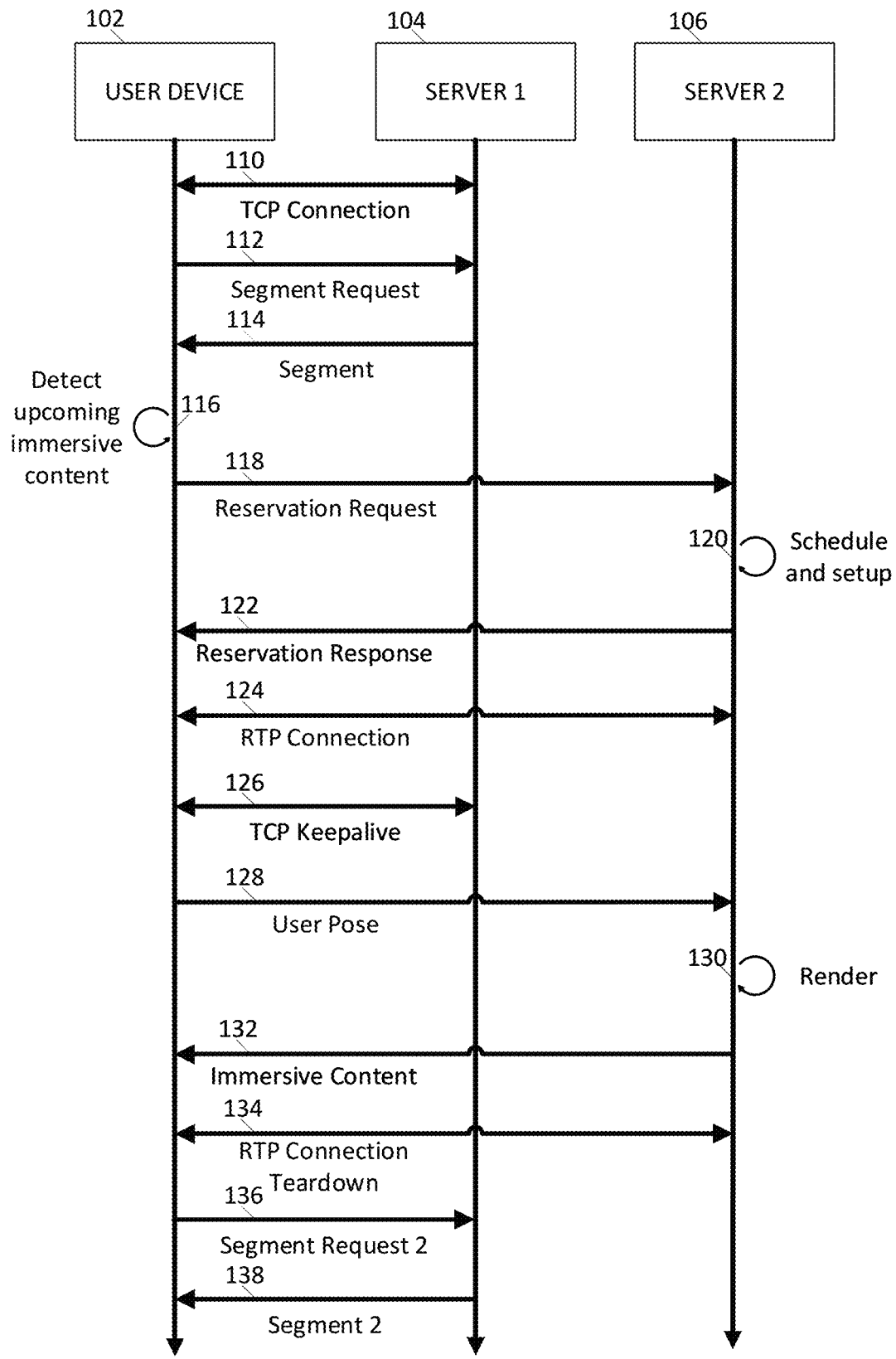
FIG. 1 shows an illustrative flowchart of a process for streaming immersive content, in accordance with embodiments of the disclosure.

FIG. 1 is an illustrative flowchart of a process 100 for streaming immersive content, in accordance with embodiments of the disclosure. In some embodiments, some steps of process 100 may be performed by one of several devices. Although a user device 102, a first server 104, and a second server 106 are shown, any number of servers and/or user devices may be used. In another example, the first server 104 and the second server 106 may be a single server. Although the process 100 is illustrated and described as a sequence of steps, it is contemplated that various embodiments of process 100 may be performed in any order or combination and need not include all the illustrated steps.

In some embodiments, the user device 102 is one or more devices capable of playing media content such as televisions, laptops, tablets, smartphones, or similar such devices. Media content/assets may be any type of media including television programs, movies, audio books, podcasts, playlists, songs, videos, audio, images or similar content, and any combination thereof. In some embodiments, media content includes or is divided into one or more segments, where the segments comprise one or more scenes.

At step 110, the user device 102 and the first server 104 (e.g., HTTP adaptive streaming server) establish a transmission control protocol (TCP) connection. In some embodiments, the TCP connection is established in response to a user input. For example, the user device may display one or more identifiers relating to media content, and the user may select one of the identifiers. In response to the user's selection, the user device 102 may transmit a TCP connection request to the first server 104. In another example, the user device 102 may transmit a TCP connection request in response to a user launching an application.

At step 112, the user device 102 transmits a first segment request to the first server 104. The first segment request may indicate a segment of a media item desired by a user. For example, if the user has selected a piece of media that the user has not previously viewed, the user device 102 can request a segment corresponding to the beginning of the piece of media. In another example, if the user has watched a portion of the piece of media, the user device 102 can request the segment corresponding to where the user stopped watching.

At step 114, the first server 104 transmits a first segment to the user device 102. In some embodiments, the first segment corresponds to the segment requested in the segment request transmitted at step 112. In some embodiments, the first segment is transmitted in a first format (e.g., 2D). In some embodiments, a format is specified in the segment request transmitted at step 112. The first server 104 may transmit the first segment to the user device 102 using MPEG-DASH, HLS, CMAF, Microsoft Smooth Streaming, and/or similar such streaming protocols. The user device 102 may then display the first segment for the user on a display. In some embodiments, when the first server 104 streams a piece of media to the user device 102, the first server 104 divides the piece of media into segments. For example, the segments may span between 2 to 10 seconds. In some embodiments, the user device 102 stores the received first segment in a buffer.

At step 116, the user device 102 detects upcoming immersive content. In some embodiments, the user device 102 uses a manifest, metadata, and/or similar such information related to the piece of content to determine that an upcoming segment of the piece of media is available in a second format (e.g., light field content). In some embodiments, the immersive content may be supplemental content or additional content associated with one or more segments. In some embodiments, step 116 repeats until the user device 102 determines that an upcoming segment is available in a second format. Step 112 and step 114 may also repeat until the user device 102 determines that an upcoming segment is available in a second format. For example, as the user device 102 finishes displaying the first segment, the user device 102 may send an additional segment request to the first server 104. The additional segment request may request a segment subsequent to the first segment.

In some embodiments, if the user device 102 determines that an upcoming segment is available in a second format, the user device 102 notifies the user. For example, the user device 102 may display a selectable graphic. The graphic can indicate to the user that an upcoming segment of the piece of media is available in the second format. In some embodiments, if the user selects the graphic, the user device 102 displays the upcoming segment in the second format. In some embodiments, the user device 102 may have access to preferences associated with the user. For example, the user may have a preference indicating that the user prefers the user device 102 to automatically play content in the second format whenever content is available in the second format.

At step 118, the user device 102 transmits a reservation request to the second server 106 (e.g., light field server, 3D content server, etc.). In some embodiments, the reservation request indicates the upcoming segment and the second format. At step 120, the second server 106 schedules and sets up an instance to transmit the upcoming segment in the second format. At step 122, the second server 106 transmits a reservation response comprising information to set up an RTP connection. At step 124, an RTP connection is established between the user device 102 and the second server 106. In some embodiments, the user device's 102 request is mapped to the second server 106 and/or a specific cloud renderer that is pre-configured to serve the type of request for which the RTP connection is established. For example, the second server 106 may be pre-configured to serve requests for segments in a particular format (e.g., 3D).

At step 126, the user device 102 and/or the first server transmits a keepalive message to keep the TCP connection operating. In some embodiments, the TCP connection is kept open to allow the user device 102 to continue streaming the piece of media in the first format using the TCP connection after the user device 102 completes streaming the piece of media in the second format using the RTP connection. Keeping the TCP connection operational allows the user device 102 to more seamlessly transition from transmitting the piece of media in the second format to the first format.

At step 128, the user device 102 transmits the pose of the user to the second server 106. In some embodiments, the user device 102 comprises one or more sensors and/or receives information from one or more sensors. The user device 102 can use the information captured using the one or more sensors to track the pose of the user. In some embodiments, the one or more sensors may be one or more image (e.g., optical) sensors (e.g., one or more cameras), accelerometers, inertial sensors, global positioning system sensors, microphones, ultrasound sensors, depth sensors, Infrared (IR) cameras, Red Green Blue (RGB) cameras, Passive IP (PIR) cameras, heat IR, proximity sensors, radar, tension sensors, near field communication (NFC) sensors, and/or similar such sensors. For example, the user device 102 may receive images from a camera and may track the user's eyes relative to a display using the images. In another example, the user device 102 may comprise an accelerometer and may estimate the user's pose using the accelerometer. In another example, an inertial sensor may be placed on the user, and the user device 102 may use the information collected by the inertial sensor to determine the user's pose. In some embodiments, the user device 102 uses light detection and ranging (LIDAR) to develop a map of the user and determine their orientation in respect to the user device 102.

At step 130, the second server 106 renders immersive content using the received pose of the user. In some embodiments, the immersive content comprises a portion of the upcoming segment in the second format. In some embodiments, the second server 106 uses the user pose received in step 128 to customize the portion of the upcoming segment for the user. For example, the second server 106 can render the light field version of the portion of the upcoming segment according to the pose of user.

At step 132, the second server 106 sends the immersive content to the user device 102. In some embodiments, the immersive content rendered in step 130 is transmitted to the user device 102 and the user device displays the immersive content. In some embodiments, the second server 106 is configured to send a portion of the piece of media in the second format, which is personalized to the user's pose. In some embodiments, buffering is not an option, since the user's pose is constantly changing and must be continuously sent to the second server 106, where the second server 106 renders a frame or plurality of frames in real-time. In some embodiments, the second server 106 uses RTP over user datagram protocol (UDP) to transmit the frame or plurality of frames rendered in step 130. Step 128, step 130, and step 132 can be repeated as the pose of the user changes. In some embodiments, the second server 106 continues to render immersive content using the received pose until receiving an updated pose from the user device 102. After receiving the updated user pose, the second server can render immersive content using the updated user pose. Accordingly, the content displayed by the user device 102 will change as the user changes positions creating the 3D "look around" effect.

At step 134, the user device 102 and second server 106 tear down the RTP connection. In some embodiments, this RTP connection ends upon completion of the immersive content. For example, a manifest associated with the piece of media content may indicate that an upcoming segment that can be played in the second format spans from minute 20 to minute 25 of the piece of the media content. After the second server 106 finishes transmitting the upcoming segment, the user device 102 and second server 106 can terminate the RTP connection.

At step 136, the user device 102 transmits a second segment request to the first server 104. The second segment request may indicate a second segment of a media item desired by the user. In some embodiments, the second segment request is transmitted before the completion of the immersive content received in step 132. For example, the user device 102 may use a manifest associated with the piece of media content to determine when the immersive content will end. As the end of the immersive content approaches, the user device 102 can request the segment subsequent to the immersive content.

At step 138, the first server 102 transmits a second segment to the user device 102. In some embodiments, the second segment corresponds to the segment requested in the second segment request transmitted at step 136. In some embodiments, the second segment is transmitted in the first format (e.g., 2D). In some embodiments, the format is specified in the second segment request transmitted at step 134. The first server 104 may transmit the second segment to the user device 102 using MPEG-DASH, HLS, CMAF, Microsoft Smooth Streaming, and/or similar such streaming protocols. The user device 102 may then display the second segment for the user using a display. In some embodiments, the second segment is received before the user device has displayed the end of the immersive content received in step 132, and the user device stores the second segment in a buffer until completion of the immersive content.

Figure 2:
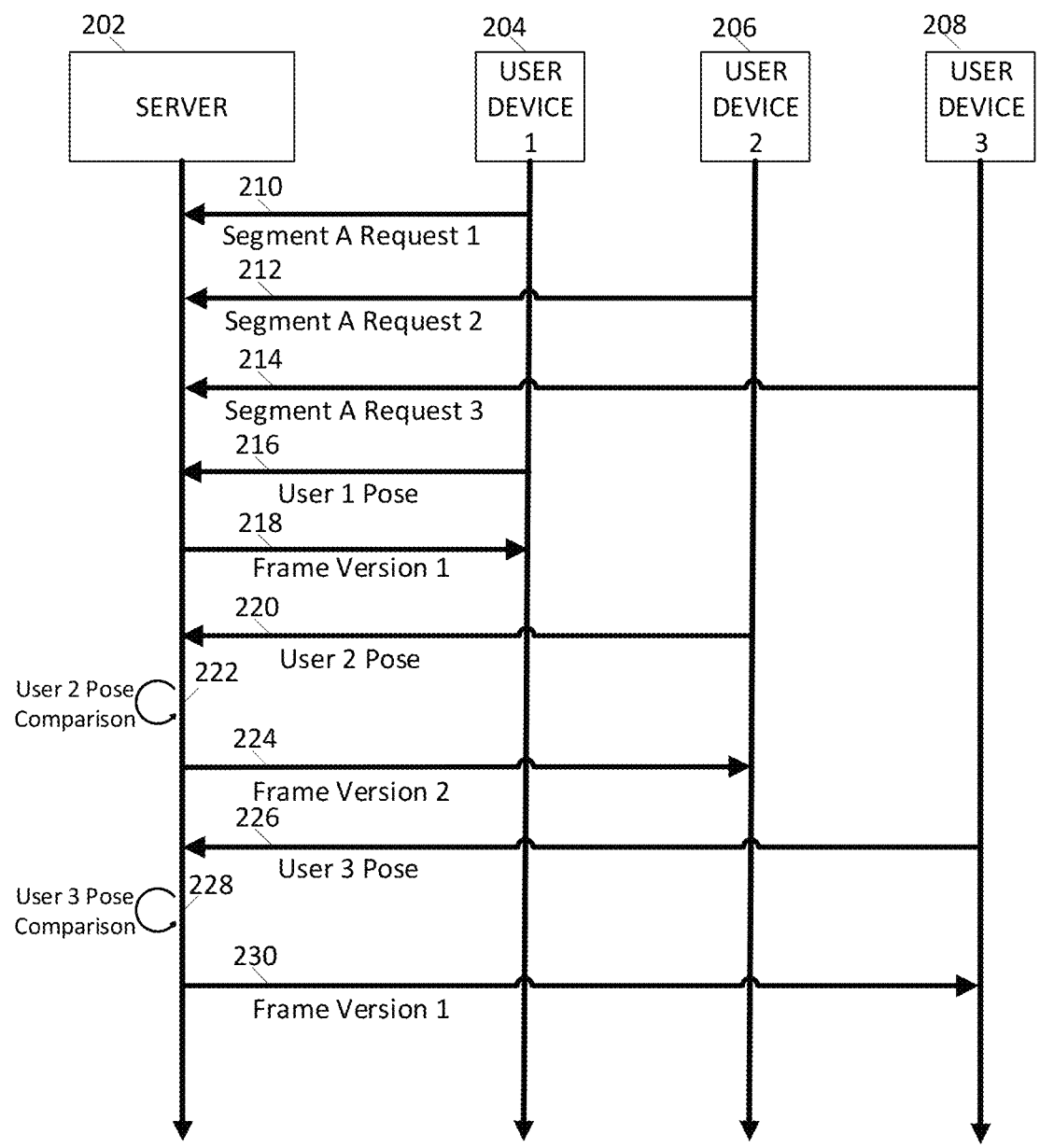
FIG. 2 shows another illustrative flowchart of a process for streaming immersive content, in accordance with embodiments of the disclosure.

FIG. 2 is another illustrative flowchart of a process 200 for streaming immersive content, in accordance with embodiments of the disclosure. In some embodiments, some steps of process 200 may be performed by one of several devices. Although a server 202, a first user device 204, a second user device 206, and a third user device 208 are shown, any number of servers and/or user devices may be used. For example, there may be two servers servicing any number of user devices. Although the process 200 is illustrated and described as a sequence of steps, it is contemplated that various embodiments of process 200 may be performed in any order or combination and need not include all the illustrated steps. In some embodiments, the server 202 establishes individual RTP sessions with the first user device 204, the second user device 206, and the third user device 208.

In some embodiments, the user devices are one or more devices capable of playing media content such as televisions, laptops, tablets, smartphones, or similar such devices. Media content/assets may be any type of media including television programs, movies, audio books, podcasts, playlists, songs, videos, audio, images or similar content, and any combination thereof. In some embodiments, media content includes or is divided into one or more segments, where the segments comprise one or more scenes.

At step 210, the first user device 204 transmits a first segment request to the server 202. In some embodiments, the first user device 204 transmits the first segment request after establishing a connection (e.g., an RTP connection) with the server 202. In some embodiments, the first segment request identifies an upcoming segment (segment A) of a piece of media content.

At step 212, the second user device 206 transmits a second segment request to the server 202. In some embodiments, the second user device 206 transmits the second segment request after establishing a connection (e.g., an RTP connection) with the server 202. In some embodiments, the second segment request identifies the upcoming segment (segment A) of the piece of media content.

At step 214, the third user device 208 transmits a third segment request to the server 202. In some embodiments, the third user device 208 transmits the third segment request after establishing a connection (e.g., an RTP connection) with the server 202. In some embodiments, the third segment request identifies the upcoming segment (segment A) of the piece of media content.

At step 216, the first user device 204 transmits a first user pose to the server 202. In some embodiments, the first user device 204 comprises one or more sensors and/or receives information from one or more sensors. The first user device 204 can use the information captured by the one or more sensors to track the pose of the first user.

At step 218, the server 202 transmits a first version of a frame to the first user device 204. In some embodiments, the first version of the frame is immersive content. In some embodiments, the frame is within the first segment requested by the first user device 204. The server 202 may use the first user pose received in step 216 to render the first version of the frame. For example, the server 202 may use light field imaging to generate the first version of the frame according to the first user pose. In some embodiments, the first user device 204 receives the first version of the frame and displays the first version of the frame for the first user. In some embodiments, step 216 and step 218 repeat. For example, the user device 204 may continue to transmit the pose of the first user, and the server 202 may continue to transmit immersive content based on the received pose of the first user. In some embodiments, the server 202 continues to send subsequent frames rendered using the first user pose until the server 202 receives an updated first user pose. In response to receiving an updated first user pose, the server 202 can render the subsequent frames according to the updated first user pose.

At step 220, the second user device 206 transmits a second user pose to the server 202. In some embodiments, the second user device 206 comprises one or more sensors and/or receives information from one or more sensors. The second user device 206 can use the information captured by the one or more sensors to track the pose of the second user.

At step 222, the server 202 compares the second user pose with the first user pose and determines that the second user pose is different than the first user pose. In some embodiments, the server 202 determines whether there is a minimum threshold distance between the first user pose and the second user pose. If the server 202 determines that the difference between the first user pose and the second user pose is greater than the minimum distance threshold, the server generates a second version of the frame.

At step 224, the server 202 transmits the second version of the frame to the second user device 206. In some embodiments, the second version of the frame is immersive content. In some embodiments, the frame is within the first segment requested by the second user device 206. The server 202 may use the second user pose received in step 220 to render the second version of the frame. For example, the server 202 may use light field imaging to generate the second version of the frame according to the second user pose. In some embodiments, the second user device 206 receives the second version of the frame and displays the second version of the frame for the second user. In some embodiments, step 220, step 222, and step 224 repeat. For example, the second user device 206 may continue to transmit the pose of the second user and the server 202 may continue to compare the received pose of the second user to previously received poses. The server 202 may then transmit immersive content based on the received pose of the second user. In some embodiments, the server 202 continues to send subsequent frames rendered using the second user pose until the server 202 receives an updated second user pose. In response to receiving an updated second user pose, the server 202 can render the subsequent frames according to the updated second user pose.

At step 226, the third user device 208 transmits a third user pose to the server 202. In some embodiments, the third user device 208 comprises one or more sensors and/or receives information from one or more sensors. The third user device 208 can use the information captured by the one or more sensors to track the pose of the third user.

At step 228, the server 202 compares the third user pose with the previously received user poses (e.g., first user pose, second user pose, updated first user pose, etc.). In some embodiments, the server 202 determines whether there is a minimum threshold distance between the third user pose and previously received user poses. If the server 202 determines that the difference between the third user pose and one of the previously received user poses is not greater than the minimum distance threshold, the server transmits the previously generated content to the third user device 208. For example, the server 202 may determine that the difference between the first user pose received in step 212 and the third user pose received in step 226 is not greater than the minimum distance threshold. The server 202 may then transmit the first version of the frame to the third user device 208 at step 230. In some embodiments, the server 202 is not required to generate an additional version of the frame for the third user device 208. In some embodiments, step 226, step 228, and step 230 repeat. For example, the second user device 206 may continue to transmit the pose of the third user, and the server 202 may continue to compare the received pose of the third user to previously received poses. The server 202 may then transmit immersive content based on the received pose of the third user. In some embodiments, the server 202 continues to send subsequent frames rendered using the second user pose until the server 202 receives an updated second user pose. In response to receiving an updated second user pose, the server 202 can render the subsequent frames according to the updated second user pose.

In some embodiments, process 200 relates to a live broadcast where the server 202 is transmitting a piece of media content to a plurality of user devices. In some embodiments, the server 202 dynamically determines user devices (e.g., first user device 204 and the third user device 208) that transmit similar user poses (e.g., differences between user poses are less than the minimum distance threshold) and transmits the same version of a frame to said user devices.

In some embodiments, one or more steps happen concurrently. For example, step 212, step 218, and step 226 can happen concurrently or within a short time period (e.g., one second). In another example, steps 214, step 222, and step 230 can happen concurrently or within a short time period.

Figure 3A:
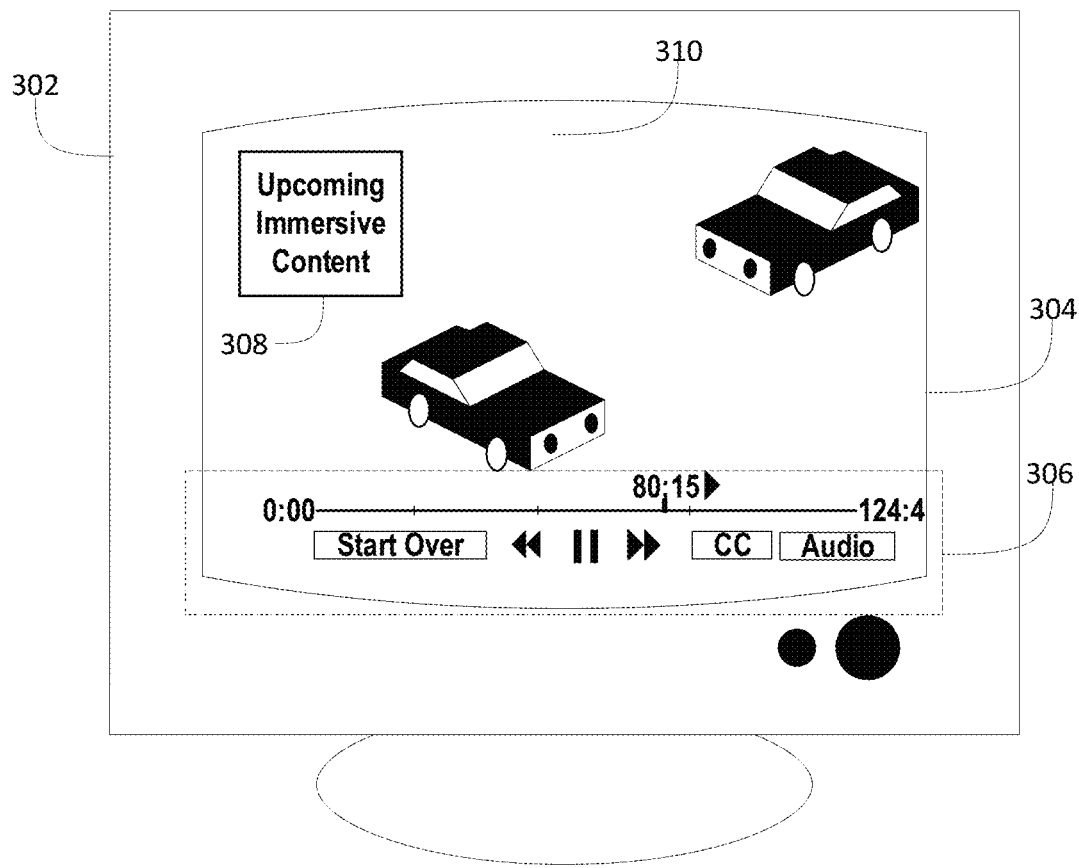
FIGS. 3A-3C show illustrative diagrams of a user device displaying notifications relating to immersive content, in accordance with embodiments of the disclosure.
Figure 3B:
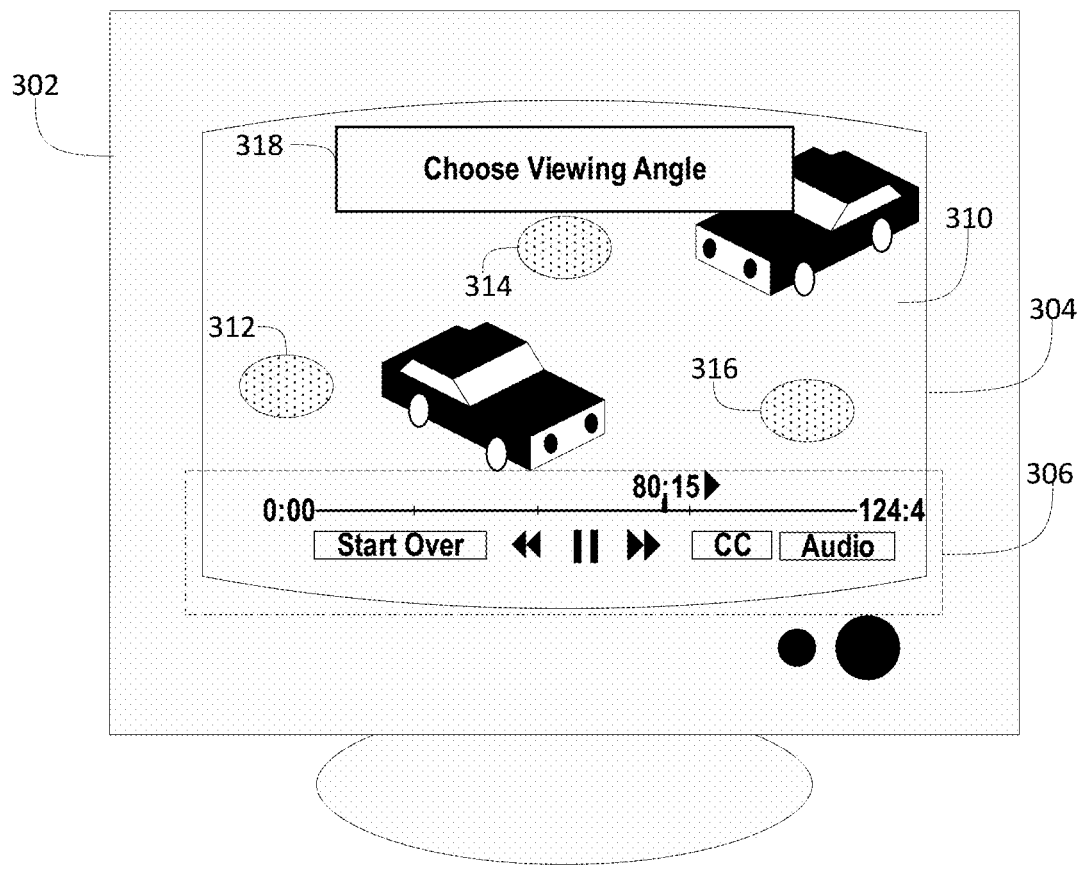
Figure 3C:
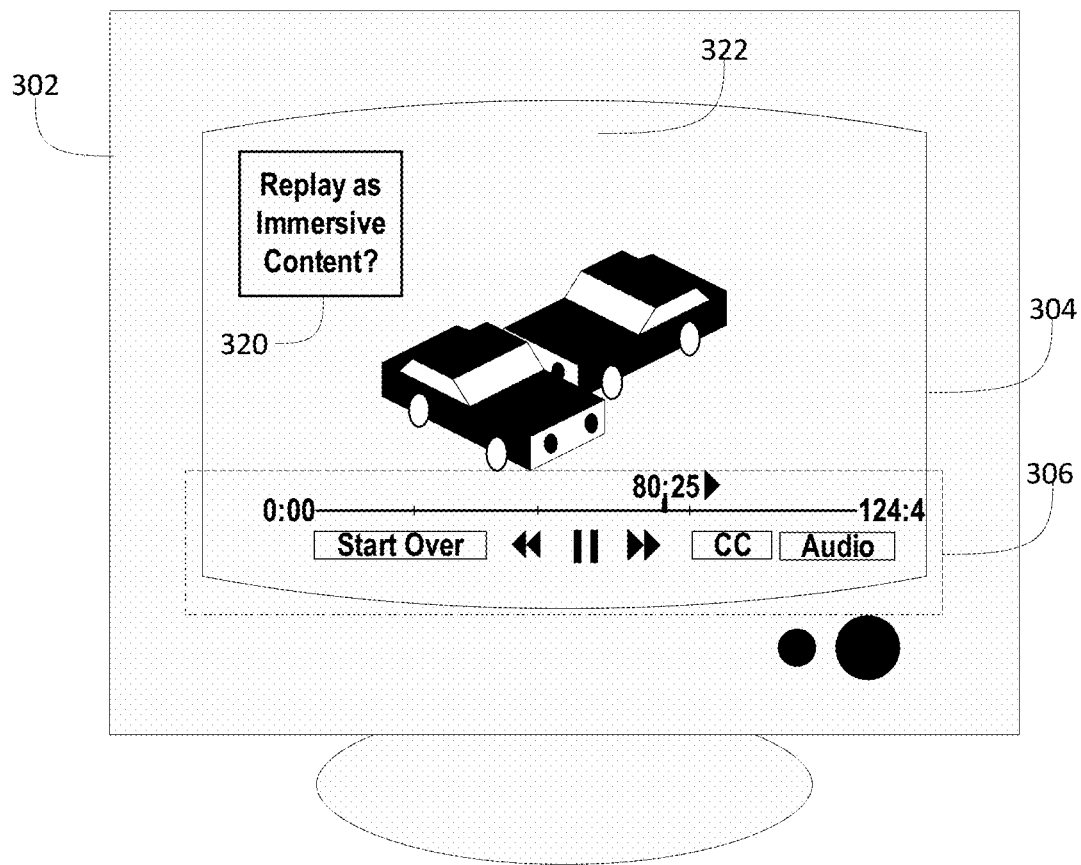

FIGS. 3A-3C show illustrative diagrams of a user device 302 displaying notifications relating to immersive content, in accordance with embodiments of the disclosure. FIG. 3A shows the user device 302 displaying a first segment 310 of a piece of media content on a display 304. Although a television is shown, the user device 302 may be any device capable of playing media content such as a laptop, tablet, smartphone, and/or similar such devices.

In some embodiments, the user device 302 displays a first segment 310 of a piece of content in a first format (e.g., 2D) and detects that an upcoming segment is available in a second format (e.g., 3D). In some embodiments, the user device 302 uses a manifest, metadata, and/or similar such information related to the piece of content to determine that an upcoming segment of the piece of media is available in the second format. For example, a manifest associated with the piece of content may indicate that the upcoming segment is available in the first format and the second format. In response to determining that the upcoming segment is available in the second format, the user device 302 displays a first notification 308. In some embodiments, the user device 302 displays the first notification 308 a length of time before the upcoming segment. For example, the user device 302 may display the first notification 308 ten seconds before the upcoming segment to allow the user time to decide whether they want to view the upcoming segment in the second format.

In some embodiments, the first notification 308 is selectable. If the user selects the first notification 308, then the user device 302 can play the upcoming segment in the second format. If the user does not select the first notification 308, then the user device 302 may not play the upcoming segment in the second format. In some embodiments, the first notification 308 also displays selectable options for the user (e.g., "No," "Yes," etc.). The first notification 308 is just one example of a type of immersive content notification that may be generated. Immersive content notifications may include different options, words, and/or be different sizes, shapes, colors, etc.

FIG. 3B shows the user device 302 displaying the first segment 310 of the piece of media content on the display 304. In some embodiments, the user device 302 detects that an upcoming segment is available from varying viewing angles. In some embodiments, the user device 302 uses a manifest, metadata, and/or similar such information related to the piece of content to determine that the upcoming segment is available from varying viewing angles. In response to determining that the upcoming segment is available from varying viewing angles, the user device 302 displays a second notification 318 along with viewpoint options (first viewpoint option 312, second viewpoint option 314, third viewpoint option 316). In some embodiments, a user can select a viewpoint option, and the user device 302 displays the upcoming segment from the selected viewpoint. For example, if the user selects the first viewpoint option 312, the user device can use light field content associated with the upcoming segment to generate the upcoming segment from the selected viewpoint.

In some embodiments, the user device 302 may utilize light field content to also provide the user with the option to select a "virtual camera" trajectory. For example, the user may select the first viewpoint option 312 for a first portion of the upcoming segment and may select the second viewpoint option 314 for a second portion of the upcoming segment. Based on the user selection, the upcoming segment may change from the first viewpoint to the second viewpoint. The change in viewpoint during the segment can give the illusion that the trajectory of the camera that filmed the scene changes. In some embodiments, the user device 302 also allows the user to change the speed at which the upcoming segment switches from a first viewpoint to a second viewpoint. In some embodiments, in response to the user selecting one or more viewpoint options, a server renders one or more frames in accordance with the selected viewing options. In some embodiments, the user device 302 allows the user to input a viewing angle. Accordingly, the first viewpoint option 312 may be one of a plurality of options selectable by the user.

FIG. 3C shows the user device 302 displaying a second segment 322 of a piece of media content on the display 304. In some embodiments, the user device 302 displays the second segment 322 of a piece of content in a first format (e.g., 2D) and detects that the second segment 322 is available in a second format (e.g., 3D). In some embodiments, the user device 302 uses a manifest, metadata, and/or similar such information related to the piece of content to determine that the second segment 322 of the piece of media is available in the second format. In response to determining that the second segment 322 is available in the second format, the user device 302 displays a third notification 320. In some embodiments, the third notification 320 is shown in addition to the first notification 308 and/or the second notification 318. In some embodiments, the third notification 320 is displayed in response to a user preference. For example, the user may select an "Immersive Content" replay option. In response to the user selecting the "Immersive Content" replay option, the user device 302 may display the third notification 320 whenever the user device 302 displays content that can be played in a second format.

In some embodiments, the third notification 320 is selectable. For example, the user device 302 may display the second segment 322 in the first format and determine that the second segment 322 is available in the second format. The user device 302 can display the third notification 320 along with the second segment 322 in the first format to notify the user that the second segment 322 is available in the second format. If the user selects the third notification 320, then the user device 302 can replay the second segment 322 in the second format. If the user does not select the third notification 320, then the user device 302 may not replay the second segment and instead continues to play a segment subsequent to the second segment 322. In some embodiments, the third notification 320 also displays selectable options for the user (e.g., "No," "Yes," etc.).

In some embodiments, a user may interact with a menu 306 to begin trick-play functionality (e.g., fast-forward, rewind, skip, pause, etc.). For example, the user may be fast-forwarding through a piece of media and select an option to play the piece of media at a certain time (e.g., 80:25). The user device 302 can determine (e.g., via a manifest, metadata, etc.) whether the piece of media is playable in the second format at the time from which the user selected to play the piece of media. If the piece of media content is available in the second format, the user device may display the third notification 320. If the piece of media content is available in the second format, the user device may display a notification asking if the user would prefer the piece of content to be played in the first format or the second format. In some embodiments, in response to the user selecting the notification, the user device 302 detects the pose of the user and sends the detected user pose and a request for the piece of media at the certain time (e.g., 80:25) to a server. In some embodiments, a notification (e.g., third notification 320) is selected by a voice command. For example, the user device 302 may detect the user say "Play immersive content replay." The user device 302 may detect the pose of the user, then send the detected user pose and a request for the piece of media at the certain time (e.g., 80:25) to a server. In some embodiments, the user device 302 automatically plays the piece of media in the second format in accordance with user preferences and does not display the third notification 320.

Figure 4:
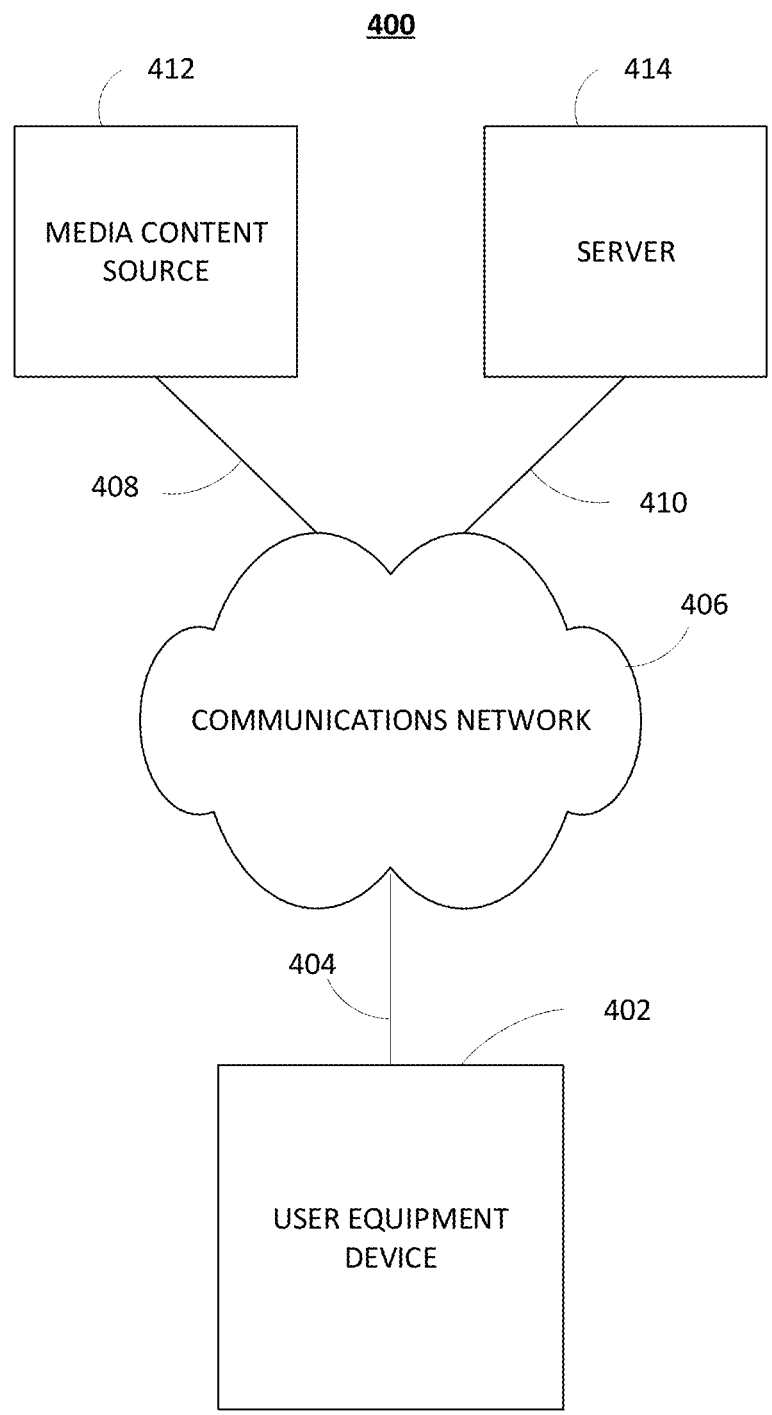
FIG. 4 shows an illustrative block diagram of a media system, in accordance with embodiments of the disclosure.
Figure 5:
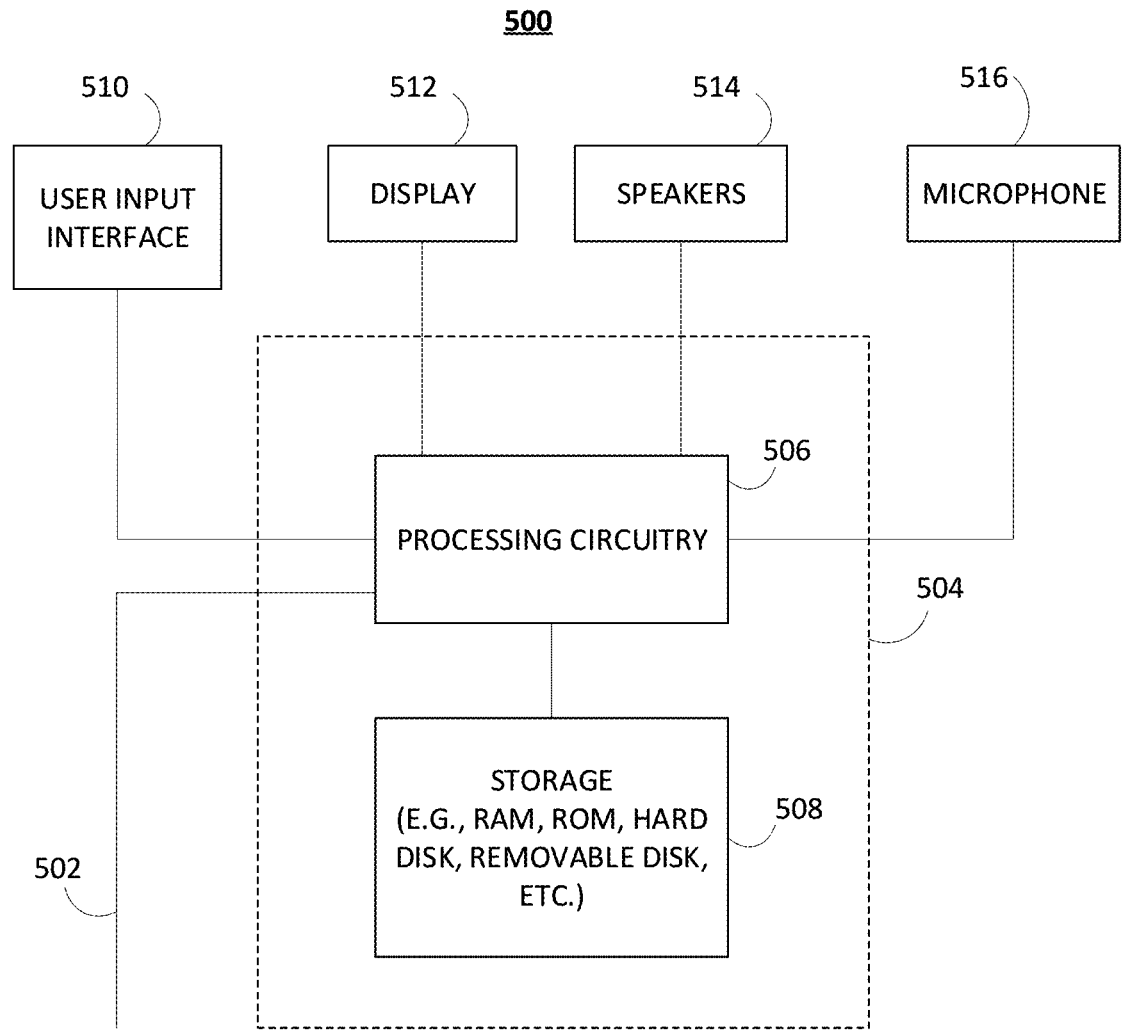
FIG. 5 shows an illustrative block diagram of a user equipment (UE) device system, in accordance with embodiments of the disclosure.

FIGS. 4-5 describe exemplary devices, systems, servers, and related hardware for streaming immersive content, in accordance with some embodiments of the disclosure. In the system 400, there can be more than one user equipment device 402, but only one is shown in FIG. 4 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 406.

The user equipment devices may be coupled to communications network 406. Namely, the user equipment device 402 is coupled to the communications network 406 via communications path 404. The communications network 406 may be one or more networks including the Internet, a mobile phone network, mobile voice or data network (e.g., a 4G, 5G, and/or LTE network), cable network, public switched telephone network, or other types of communications network or combinations of communications networks. The path 404 may separately or together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, path 404 can be a wireless path. Communications with the user equipment device 402 may be provided by one or more communications paths but is shown as a single path in FIG. 4 to avoid overcomplicating the drawing.

The system 400 also includes media content source 412, and server 414, which can be coupled to any number of databases providing information to the user equipment devices. The media content source 412 represents any computer-accessible source of content, such as a storage for video content, audio content, metadata, or, similar such information. In some embodiments, the media content source 412 is one or more servers. In some embodiments, there can be more than one media content source 412. For example, a first media content source may store and/or generate media content in a first format and a second media content source may store and/or generate media content in a second format. The server 414 may store and execute various software modules to implement the streaming of immersive content functionality. In some embodiments, the media content source 412 may be stored on the server 414. In some embodiments, the user equipment device 402, media content source 412, and server 414 may store metadata associated with a media asset.

FIG. 5 shows a generalized embodiment of a user equipment device 500, in accordance with one embodiment. In an embodiment, the user equipment device 500 is the same user device 102 of FIG. 1. The user equipment device 500 may receive content and data via input/output (I/O) path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry 506 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The streaming of immersive content functionality can be at least partially implemented using the control circuitry 504. The streaming of immersive content functionality described herein may be implemented in or supported by any suitable software, hardware, or combination thereof. The streaming of immersive content functionality can be implemented on user equipment, on remote servers, or across both.

In client/server-based embodiments, the control circuitry 504 may include communications circuitry suitable for communicating with one or more servers that may at least implement the described streaming of immersive content functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing.

The user equipment device 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of user equipment device 500 or may be a stand-alone unit.

The user equipment device 500 of FIG. 5 can be implemented in system 400 of FIG. 4 as user equipment device 402, but any other type of user equipment suitable for streaming immersive content may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 6:
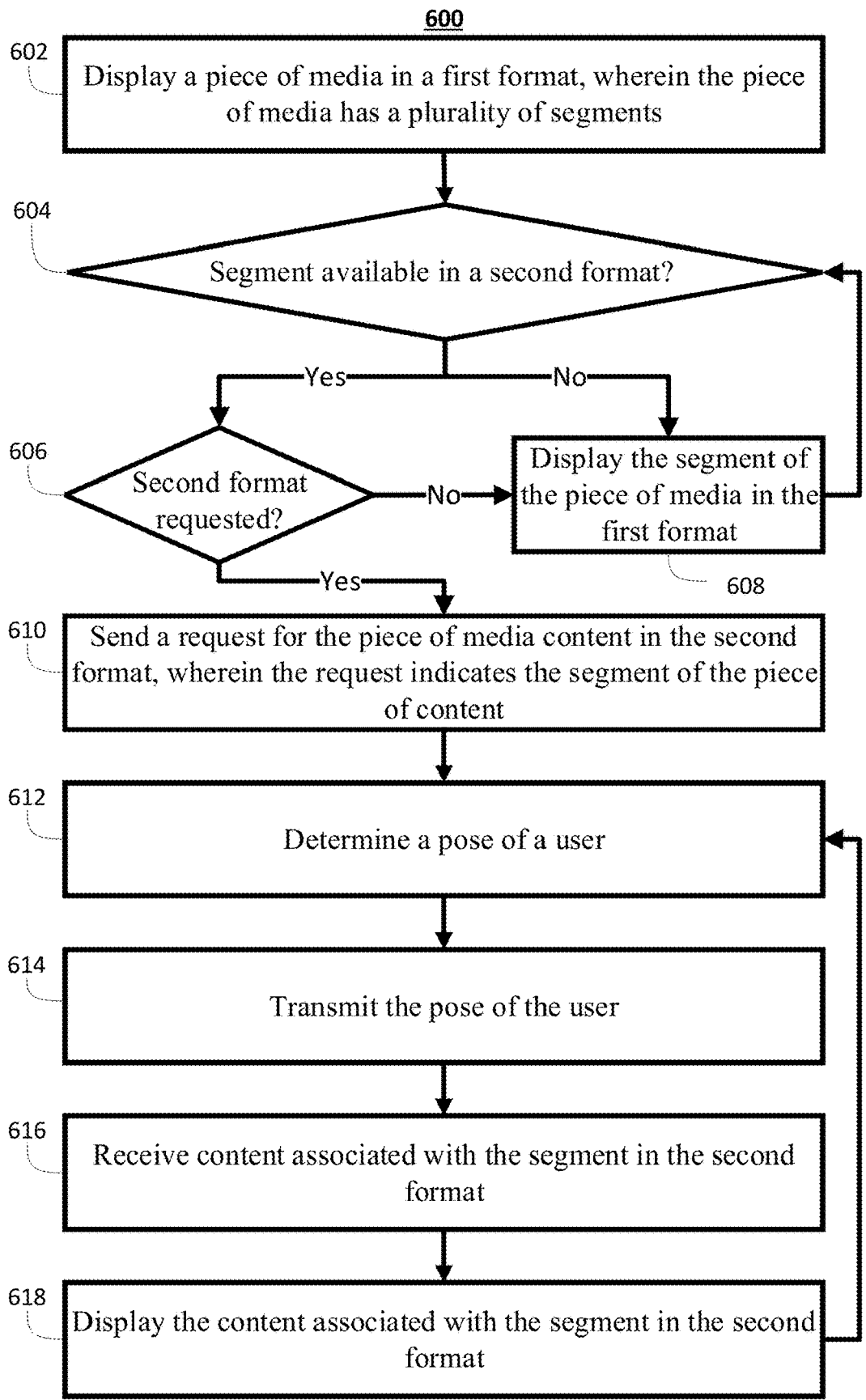
FIG. 6 is an illustrative flowchart of a process for streaming immersive content, in accordance with embodiments of the disclosure.

FIG. 6 is an illustrative flowchart of a process 600 for streaming immersive content, in accordance with embodiments of the disclosure. Process 600, and any of the following processes, may be executed by control circuitry 504 on a user equipment device 500. In some embodiments, control circuitry 504 may be part of a remote server separated from the user equipment device 500 by way of a communications network or distributed over a combination of both. In some embodiments, instructions for executing process 600 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry, and the like. It should be noted that the process 600, or any step thereof, could be performed on, or provided by, any of the devices shown in FIGS. 1-5. Although the process 600 is illustrated and described as a sequence of steps, it is contemplated that various embodiments of process 600 may be performed in any order or combination and need not include all the illustrated steps.

At 602, control circuitry displays a piece of media in a first format, wherein the piece of media has a plurality of segments. In some embodiments, the control circuitry receives the piece of media in the first format from a server using MPEG-DASH, HLS, CMAF, Microsoft Smooth Streaming, and/or similar such streaming protocols. The control circuitry can then display the piece of media received from the server. In some embodiments, the control circuitry stores a portion of the received piece of content in a buffer until the portion of the received piece of content is needed for playback.

At 604, control circuitry determines whether a segment of the piece of media is available in a second format. In some embodiments, the control circuitry uses a manifest, metadata, and/or similar such information related to the piece of content to determine whether the segment of the piece of media is available in a second format (e.g., light field content). In some embodiments, "the segment" refers to the segment being displayed by the control circuitry at step 602. In some embodiments, "the segment" refers to an upcoming segment that is subsequent to the segment being displayed by the control circuitry at step 602. In some embodiments, "the segment" refers to an upcoming segment scheduled to play within a threshold time period of the completion of the segment being displayed by the control circuitry at step 602. If the control circuitry determines that the segment is not available in the second format, the process 600 continues to step 608. If the control circuitry determines that the segment is available in the second format, the process 600 continues to step 606.

At 606, control circuitry determines whether the user has requested the segment of the piece of media in a second format. In some embodiments, the control circuitry makes this determination based on one or more user inputs. For example, the control circuitry may display a selectable graphic indicating that the segment in available in the second format. In some embodiments, if the user selects the graphic, then the control circuitry determines that the user has requested the segment of the piece of media in the second format. In another example, the selectable graphic may indicate that the control circuitry will display the segment in the second format unless the graphic is selected by the user. If the user does not select the graphic within a threshold time period, the control circuitry may automatically determine that the user has requested the segment in the second format.

In some embodiments, the control circuitry determines whether the user has requested the segment of the piece of media in the second format based on one or more user preferences. In some embodiments, the control circuitry has access to a database comprising one or more user preferences, and the control circuitry determines if the user requests the segment in the second format based on the user preferences. For example, the user may have preferences indicating that the control circuitry automatically plays content in the second format whenever content is available in the second format. In another example, the user may have preferences indicating that the user prefers the option to view immersive content replays. In such an example, the control circuitry may display an option (e.g., graphic) as described above to determine if the second format is requested by the user. If the control circuitry determines that the user has not requested the segment in the second format, the process 600 continues to step 608. If the control circuitry determines that the user has requested the segment in the second format, the process 600 continues to step 610.

At 608, control circuitry displays the segment of the piece of media in the first format. In the embodiments where the segment refers to the segment displayed in step 602, the control circuitry does not display the segment in the second format, instead the control circuitry continues to play the segment in the first format and then plays a subsequent segment upon the completion of the segment. In some embodiments, the process returns to step 604, where the control circuitry determines whether the subsequent segment is available in the second format. In the embodiments where the segment refers to the segment subsequent to what is displayed in step 602, the control circuitry displays the segment in the first format in the same or similar methodology as described in step 602.

At 610, control circuitry sends a request for the piece of media content in the second format, wherein the request indicates the segment of the piece of content. In some embodiments, the request indicates the segment using a time period. For example, the request may indicate the segment from two minutes through four minutes of the piece of media content. In some embodiments, the control circuitry sends the request to a server (e.g., rendering server).

At 612, control circuitry determines a pose of a user. In some embodiments, the control circuitry comprises one or more sensors and/or receives information from one or more sensors. The control circuitry can use the information captured by the one or more sensors to track the pose of the user. In some embodiments, the one or more sensors may be one or more image (e.g., optical) sensors (e.g., one or more cameras), accelerometers, inertial sensors, global positioning system sensors, microphones, ultrasound sensors, depth sensors, IR cameras, RGB cameras, PIR cameras, heat IR, proximity sensors, radar, tension sensors, NFC sensors, and/or similar such sensors. For example, the control circuitry may receive images from a camera and track the user's eyes relative to a display using the images. In another example, the control circuitry may comprise an accelerometer and may estimate the user's pose using the accelerometer. In another example, an inertial sensor may be placed on the user, and the control circuitry may receive the information collected using the inertial sensor.

At 614, control circuitry transmits the pose of the user determined in step 612. In some embodiments, the control circuitry transmits the pose of the user and the request for the piece of media content to the same server. In some embodiments, a server uses the user pose to customize the segment for the user. For example, the server can render a light field version of the segment according to the pose of the user. In some embodiments, the control circuitry sends the request to a server (e.g., rendering server). In some embodiments, the request is mapped to a server and/or a specific cloud renderer that is pre-configured to serve the type of request. For example, a server may be pre-configured to serve requests for segments of a particular format (e.g., 3D).

At 616, control circuitry receives content associated with the segment in the second format. In some embodiments, the control circuitry receives the content associated with the segment in the second format from a server (e.g., rendering server) via an RTP connection.

At 618, control circuitry displays the content associated with the segment in the second format. In some embodiments, the process 600 continues to step 612, where the pose of the user is determined again. For example, the control circuitry may determine a change in the user pose, and the received content will be generated based on the new user pose. In some embodiments, step 612, step 614, step 616, and step 618 are repeated for each frame in the requested segment.

Figure 7:
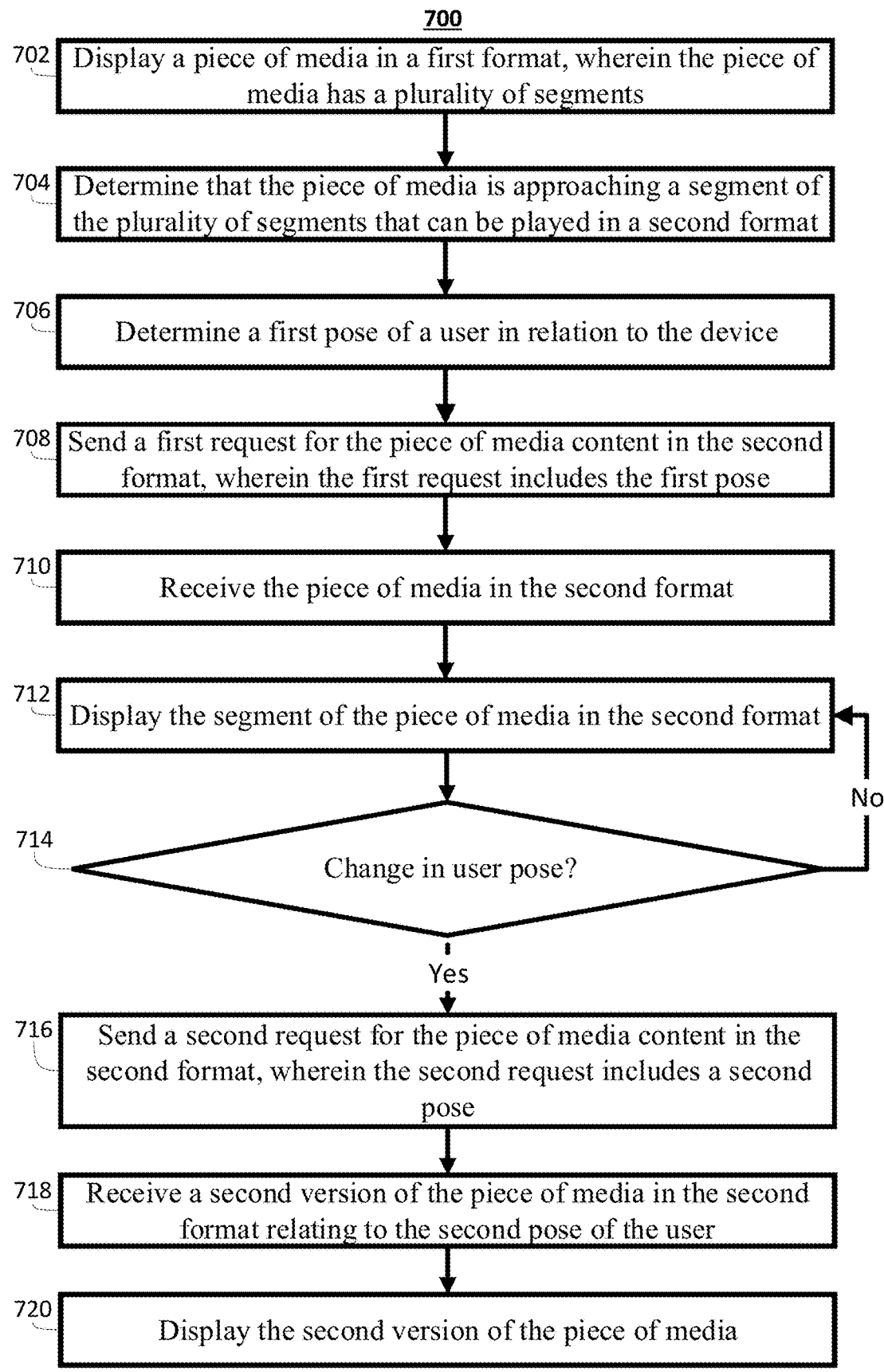
FIG. 7 is another illustrative flowchart of a process for streaming immersive content, in accordance with embodiments of the disclosure.

FIG. 7 is another illustrative flowchart of a process 700 for streaming immersive content, in accordance with embodiments of the disclosure.

At 702, control circuitry displays a piece of media in a first format, wherein the piece of media has a plurality of segments. In some embodiments, step 702 uses the same or similar methodologies as step 602 above.

At 704, control circuitry determines whether a segment of the piece of media is available in a second format. In some embodiments, the control circuitry uses a manifest, metadata, and/or similar such information related to the piece of content to determine that the segment of the piece of media is available in a second format (e.g., light field content). In some embodiments, the segment refers to the segment being displayed by the control circuitry at step 702. In some embodiments, the segment refers to an upcoming segment that is subsequent to the segment being displayed by the control circuitry at step 702. In some embodiments, the segment refers to an upcoming segment scheduled to play within a threshold time period of the completion of the segment being displayed by the control circuitry at step 702.

At 706, control circuitry determines a first pose of a user. In some embodiments, step 706 uses the same or similar methodologies as step 612 above.

At 708, control circuitry sends a first request for the piece of media content in the second format, wherein the first request indicates the segment of the piece of content and the pose of the user. In some embodiments, the request indicates the segment using a time period. For example, the request may indicate the segment from two minutes through four minutes of the piece of media content. In some embodiments, the control circuitry sends the request to a server (e.g., rendering server). In some embodiments, a server uses the user pose to customize the segment for the user. For example, the server can render a light field version of the segment according to the pose of the user. In some embodiments, the control circuitry sends the request to a server (e.g., rendering server). In some embodiments, the request is mapped to a server and/or a specific cloud renderer that is pre-configured to serve the type of request. For example, a server may be pre-configured to serve requests for segments of a particular format (e.g., 3D).

At 710, control circuitry receives the piece of media content in the second format. In some embodiments, the control circuitry receives the piece of media content in the second format from a server (e.g., rendering server) via an RTP connection.

At 712, control circuitry displays the segment of the piece of media in the second format.

At 714, control circuitry determines whether the user changes from the first pose determined in step 706. In some embodiments, the control circuitry monitors the user using the one or more sensors from step 706 to determine if the user changes from the first pose. In some embodiments, if the control circuitry determines that the user has moved greater than a threshold distance from the first pose, the control circuitry determines that the user has changed poses. If the control circuitry determines that the user has not moved greater than a threshold distance from the first pose, the control circuitry determines that the user has not changed poses. If the control circuitry determines that the user has not changed poses, the process 700 returns to step 712, and the control circuitry continues to display the segment of the piece of media in the second format. If the control circuitry determines that the user has changed poses, the process 700 continues to step 716.

At 716, control circuitry sends a second request for the piece of media content in the second format, wherein the second request indicates the second pose of the user. In some embodiments, a server uses the second user pose to generate a second version of the segment for the user. In some embodiments, the second version of the segment refers to the segment from a different point of view. For example, the server may render a light field version of the segment according to the second pose of user. In some embodiments, the control circuitry sends the second request to a server (e.g., rendering server). In some embodiments, the second request is mapped to a server and/or a specific cloud renderer that is pre-configured to serve the type of request. In some embodiments, the second request also identifies a portion of the segment required for playback. For example, if the control circuitry has already displayed the first 30 seconds of the segment in the second format, the second request may indicate that only a portion of the segment (e.g., starting at 31 seconds) is required in the second version.

At 718, control circuitry receives a second version of the piece of the media in the second format relating to the second pose of the user. In some embodiments, the control circuitry receives the piece of media content in the second format using the same connection (e.g., an RTP connection) used in step 710.

At 720, control circuitry displays the second version of the piece of media.

It is contemplated that some suitable steps or suitable descriptions of FIGS. 1, 2, 6, and 7 may be used with other suitable embodiments of this disclosure. In addition, some suitable steps and descriptions described in relation to FIGS. 6-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 1, 2, 6, and 8.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   displaying, on a device, a first segment of a plurality of segments in a two-dimensional format, wherein:
      the plurality of segments correspond to a piece of media; and
      each segment of the plurality of segments corresponds to a time period of the piece of media;
   determining that the first segment of the plurality of segments can be displayed in a three-dimensional format;
   determining that the piece of media is approaching a second segment of the plurality of segments;
   displaying, on the device, a selectable option indicating the availability of the first segment in the three-dimensional format based, at least in part, on determining that the piece of media is approaching the second segment of the plurality of segments;
   receiving an input from the user corresponding to the selectable option;
   determining a position of a user in relation to the device;
   sending a request for the first segment of the plurality of segments in the three-dimensional format, wherein:
      the request identifies the first segment of the plurality of segments and the position of the user; and
      the request is sent based, at least in part, on receiving the input from the user corresponding to the selectable option
   receiving the first segment of the plurality of segments in the three-dimensional format; and
   replaying, on the device, the first segment of the plurality of segments in the three-dimensional format.

2. The method of claim 1, further comprising determining a preference corresponding to the user using a database of stored preferences, wherein the preference corresponds to displaying the piece of media in the three-dimensional format, wherein displaying, on the device, the selectable option indicating the availability of the first segment in the three-dimensional format is based, at least in part, on determining the preference.

3. The method of claim 1, wherein the selectable option also indicates the availability of the first segment in the three-dimensional format from a different point of view.

4. The method of claim 1, further comprising displaying, on the device, the second segment of the plurality of segments in the two-dimensional format, wherein the second segment of the plurality of segments is displayed in the two-dimensional format after the first segment of the plurality of segments is replayed in the three-dimensional format.

5. The method of claim 1, further comprising:
   receiving the first segment of a plurality of segments in the two-dimensional format using a first protocol; and
   receiving the first segment of the plurality of segments in the three-dimensional format using a second protocol.

6. The method of claim 5, wherein the first protocol is an adaptive streaming protocol.

7. The method of claim 5, wherein the second protocol is a real-time transport protocol.

8. The method of claim 1, further comprising:
   determining a second position of the user in relation to the device;
   sending a second request for the first segment of the plurality of segments in the three-dimensional format, wherein the second request identifies the first segment of the plurality of segments and the second position of the user; and
   receiving a second version of the first segment of the plurality of segments in the three-dimensional format relating to the second position; and
   displaying the second version of the first segment of the plurality of segments in the three-dimensional format.

9. An apparatus, comprising:
   control circuitry; and
   at least one memory including computer program code for one or more programs, the at least one memory and the computer program code configured to, with the control circuitry, cause the apparatus to perform at least the following:
      display a first segment of a plurality of segments in a two-dimensional format, wherein:
         the plurality of segments correspond to a piece of media; and
         each segment of the plurality of segments corresponds to a time period of the piece of media;
      determine that the first segment of the plurality of segments can be displayed in a three-dimensional format;
      determine that the piece of media is approaching a second segment of the plurality of segments;
      display a selectable option indicating the availability of the first segment in the three-dimensional format based, at least in part, on determining that the piece of media is approaching the second segment of the plurality of segments;
      receive an input from the user corresponding to the selectable option;
      determine a position of a user in relation to the apparatus;
      send a request for the first segment of the plurality of segments in the three-dimensional format, wherein;
         the request identifies the first segment of the plurality of segments and the position of the user; and the request is sent based, at least in part, on receiving the input from the user corresponding to the selectable option;

receive the first segment of the plurality of segments in the three-dimensional format; and replay the first segment of the plurality of segments in the three-dimensional format.

10. The apparatus of claim 9, wherein the apparatus is further caused to determine a preference corresponding to the user using a database of stored preferences, wherein the preference corresponds to displaying the piece of media in the three-dimensional format, wherein the apparatus is caused to display the selectable option indicating the availability of the first segment in the three-dimensional format based, at least in part, on determining the preference.

11. The apparatus of claim 9, wherein the selectable option also indicates the availability of the first segment in the three-dimensional format from a different point of view.

12. The apparatus of claim 11, wherein the apparatus is further caused to display the second segment of the plurality of segments in the two-dimensional format, wherein the second segment of the plurality of segments is displayed in the two-dimensional format after the first segment of the plurality of segments is replayed in the three-dimensional format.

13. The apparatus of claim 9, wherein the apparatus is further caused to:

receive the first segment of a plurality of segments in the two-dimensional format using a first protocol; and receive the first segment of the plurality of segments in the three-dimensional format using a second protocol.

14. The apparatus of claim 13, wherein the first protocol is an adaptive streaming protocol.

15. The apparatus of claim 13, wherein the second protocol is a real-time transport protocol.

16. The apparatus of claim 9, wherein the apparatus is further caused to:

determine a second position of the user in relation to the apparatus;

send a second request for the first segment of the plurality of segments in the three-dimensional format, wherein the second request identifies the first segment of the plurality of segments and the second position of the user;

receive a second version of the first segment of the plurality of segments in the three-dimensional format relating to the second position; and display the second version of the first segment of the plurality of segments in the three-dimensional format.

17. The method of claim 1, further comprising:

determining that the first segment of the plurality of segments corresponds to a first time period of the piece of media;

determining that the second segment of the plurality of segments corresponds to a second time period of the piece of media; and displaying the selectable option a first length of time before the second time period.

18. The method of claim 1, further comprising:

displaying, on the device, a second selectable option indicating a first point of view and a second point, wherein the second selectable option is displayed based, at least in part, on receiving the input from the user corresponding to the selectable option;

receiving a second input from the user corresponding to the first point of view, wherein:

the request identifies the first segment of the plurality of segments, the position of the user, and the first point of view; and the first segment of the plurality of segments in replayed in the three-dimensional format from the first point of view.

19. A non-transitory computer-readable medium having instructions encoded thereon that, when executed by control circuitry, cause the control circuitry to:

generate for display a first segment of a plurality of segments in a two-dimensional format, wherein the plurality of segments correspond to a piece of media; and determine that the first segment of the plurality of segments can be displayed in a three-dimensional format;

determine that the piece of media is approaching a second segment of the plurality of segments;

generate for display a selectable option indicating the availability of the first segment in the three-dimensional format based, at least in part, on determining that the piece of media is approaching the second segment of the plurality of segments;

receive an input from the user corresponding to the selectable option;

determine a position of a user in relation to the apparatus;

send a request for the first segment of the plurality of segments in the three-dimensional format, wherein:

the request identifies the first segment of the plurality of segments and the position of the user; and the request is sent based, at least in part, on receiving the input from the user corresponding to the selectable option;

receive the first segment of the plurality of segments in the three-dimensional format; and generate for replay the first segment of the plurality of segments in the three-dimensional format.

* * * * *